United States Patent
Konishi et al.

(10) Patent No.: US 6,848,895 B2
(45) Date of Patent: Feb. 1, 2005

(54) DISPLAY APPARATUS OF AN INJECTION MOLDING MACHINE AND AN INJECTION MOLDING MACHINE

(75) Inventors: Toshio Konishi, Chiba (JP); Susumu Moriwaki, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/281,220

(22) Filed: Oct. 28, 2002

(65) Prior Publication Data

US 2003/0082255 A1 May 1, 2003

(30) Foreign Application Priority Data

Oct. 26, 2001 (JP) ........................................ 2001-328665

(51) Int. Cl.$^7$ .............................................. B29C 45/76
(52) U.S. Cl. ..................... 425/130; 264/40.5; 264/40.6; 264/40.7; 425/143; 425/144; 425/145; 425/149; 425/150; 425/171
(58) Field of Search ............................... 425/144, 145, 425/149, 150, 143, 522, 130, 171; 264/40.5, 40.6, 40.7

(56) References Cited

U.S. PATENT DOCUMENTS

| | | | |
|---|---|---|---|
| 5,316,707 A | | 5/1994 | Stanciu et al. |
| 5,470,218 A | * | 11/1995 | Hillman et al. ............. 425/144 |
| 5,919,492 A | | 7/1999 | Tarr et al. |
| 2002/0084543 A1 | | 7/2002 | Buja |

FOREIGN PATENT DOCUMENTS

| EP | 0 473 944 A2 | 3/1992 |
|---|---|---|
| EP | 0 529 087 A1 | 3/1993 |
| EP | 0 916 466 A1 | 5/1999 |
| EP | 1 142 687 A2 | 10/2001 |
| JP | 5-42575 | 2/1993 |

OTHER PUBLICATIONS

Complete Automatic Manufacturing Activity Control, Cincinnati Milacron pamphlet, 1984.*
Patent Abstracts of Japan, Fol. 1998. No. 09, Jul. 31, 1998, JP 10086201.
Patent Abstracts of Japan, vol. 1998, No. 14, Dec. 31, 1998, JP 10249888.
Patent Abstracts of Japan, vol. 018, No. 258 (M–1606), May 17, 1994, JP 06039889.
Patent Abstracts of Japan, vol. 1998, No. 14, Dec. 31, 1998, JP 10249904.
Patent Abstracts of Japan, vol. 017, No. 275 (M–1418), May 27, 1993, JP 05008275.
Patent Abstracts of Japan, vol. 018, No. 521 (M–1981), Sep. 30, 1994, JP 06179232.
Patent Abstracts of Japan, vol. 1998, No. 014, No. 366 (P–1089), Aug. 8, 1990, JP 02135525.

* cited by examiner

Primary Examiner—Tim Heitbrink
(74) Attorney, Agent, or Firm—Squire, Sanders & Dempsey L.L.P.

(57) ABSTRACT

A display apparatus of an injection molding apparatus has a plurality of display areas on a screen of a display unit so as to perform a profile display of a molding data profile on an individual area basis. A program memory stores a program for defining a plurality of independent display areas on a screen of a display part, a program for arbitrarily relating the molding data to each of the display areas, a program for setting a display start timing to display the molding data profile related to each of the display areas, and a program for displaying the molding data profile related to each of the display areas on an individual area basis. A display control part controls the display part to display the molding data profile independently in the plurality of display areas on an individual area basis.

18 Claims, 11 Drawing Sheets

DISPLAY APPARATUS OF AN INJECTION MOLDING MACHINE AND AN INJECTION MOLDING MACHINE

BACKGROUND OF THE INVENTION

1. Field of the Invention

The present invention generally relates to injection molding machines and, more particularly, to an injection molding machine having a display apparatus.

2. Description of the Related Art

Generally, in an injection molding machine, various sensors including a pressure sensor are provided in each part so as to acquire detection signals as molding data from the sensor. The acquired molding data is used for determination of molding conditions and check of a molding operation. In order to make use of the molding data easier, the molding data is displayed as a waveform chart (graph) on a screen of a display unit.

Japanese Laid-Open Patent Application No. 5-42575 discloses a display apparatus of an injection molding machine, which comprises a group of sensors, an input unit, a microcomputer and a display unit. The display unit of the injection molding machine disclosed in this patent document selects one of a plasticization/measuring process, an injection process and a die opening/closing process, and displays the molding data of the selected process on the display unit.

Since a profile display of molding-data profile enables an instantaneous quality judgment of a state of injection molding, the display of molding-data profile is very convenient when running continuously an injection molding machine. Hereinafter, the profile display may be referred to as a waveform display. A plurality of processes of an injection molding are not independent from each other, and the processes are related mutually. Accordingly, it is more convenient if molding data regarding a plurality of processes (for example, two consecutive processes) can be simultaneously displayed on a screen of a display unit since the causal relationship between the processes can be grasped easily.

However, in a display apparatus of a conventional injection molding machine, only molding data of a predetermined drawing start timing can be displayed on a screen of the display apparatus. Therefore, in the display apparatus of the conventional injection molding machine, there is a problem in that molding data regarding two or more mutually related processes cannot be displayed simultaneously on the screen.

SUMMARY OF THE INVENTION

The apparatus according to the present invention can provide an improved and useful display apparatus of an injection molding machine, which displays a molding-data profile on a screen of a display unit, molding data detected by a plurality of sensors provided to each part of the injection molding machine or stored in a controller, the display apparatus having: a first memory part storing the molding data; an input part through which an operator input an instruction; a second memory part which stores a program for defining a plurality of independent display areas on a screen of the display unit, a program for arbitrarily relating the molding data to each of the display areas in accordance with an instruction input through the input part, a program for setting a display start timing to display the molding data related to each of the display areas in accordance with an instruction input through the input part, and a program for displaying the molding data related to each of the display areas on an individual area basis in accordance with an instruction input through the input part; and a display control part which executes the programs stored in the second memory part, wherein the molding data is independently displayed in the plurality of display areas on an individual area basis.

Additionally, there is provided according to the present invention an injection molding machine having the above-mentioned display apparatus.

Other objects, features and advantages of the present invention will become more apparent from the following detailed description when read in conjunction with the accompanying drawings.

DETAILED DESCRIPTION OF THE PREFERRED EMBODIMENTS

A description will now be given of a display apparatus of an injection molding machine according to one example of the present invention.

Figure 1:
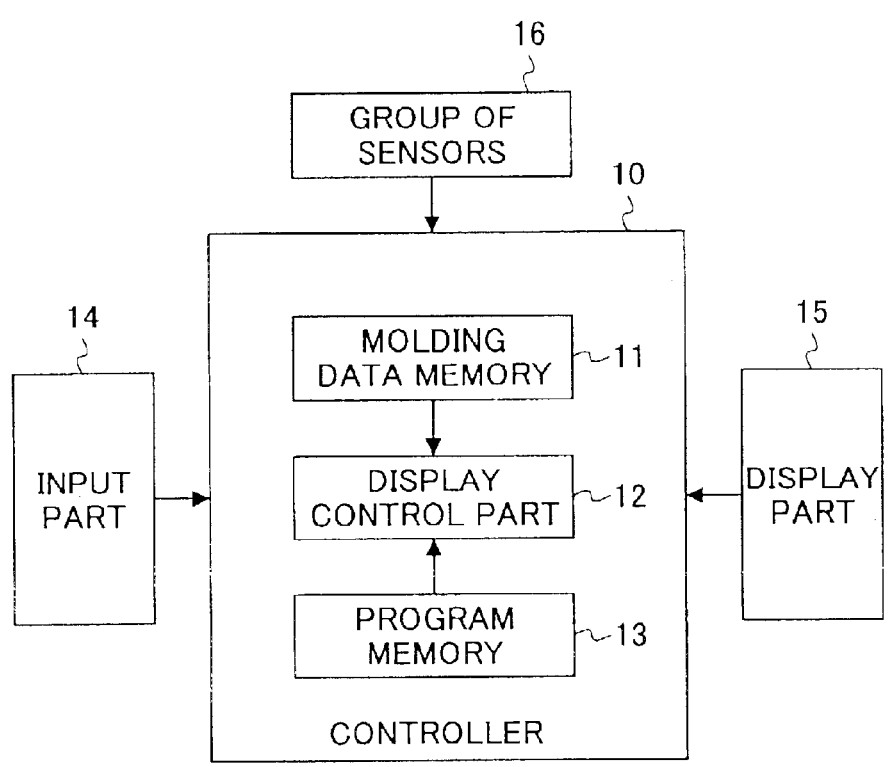
FIG. 1 is a block diagram of a display apparatus of an injection molding apparatus according to one example of the present invention.

FIG. 1 is a block diagram of a display apparatus of an injection molding apparatus according to one example of the present invention. The display apparatus comprises a molding-data memory 11 included in a controller 10 which controls an operation of an injection molding machine, a display control part 12, a program memory 13, an input part 14 which is provided in a control panel of the injection molding machine, and a display part 15.

The molding-data memory 11 stores molding data output from a plurality of sensors (a group of sensors) 16 provided to each part of the injection molding machine and molding data within the controller 10. It should be noted that, the molding data inside the controller 10 includes, for example, a set of molding data obtained by processing molding data from the sensors 16 and a set of molding data, which is input through the input part 14. Additionally, the molding-data memory 11 stores a part of the molding data as another file in accordance with an instruction supplied through the input part 14.

The display control part 12 executes programs stored in the program memory 13, and controls the display part 15 to display a waveform chart (graph) as the molding-data profile stored in the molding-data memory 11. Hereinafter, a waveform or a waveform chart of the molding data may be referred to as a profile.

The program memory 13 stores programs required to causing the display part 15 to display the molding data in the form of a waveform chart. The programs stored in the program memory 13 includes: a program for defining a plurality of areas independent from each other on a screen of the display part 15; a program for relating arbitrarily the molding data stored in the molding-data memory 11 to each display area according to an instruction supplied from the input part 14; a program for setting a display start timing to display the molding data related to each display area according to an instruction supplied from the input part 14; a program for setting a measuring-time scale in each display area according to an instruction supplied from the input part 14; a program for setting items (data name) of the X-axis and Y-axis of each display area according to an instruction supplied from the input part 14; a program for switching the display manner of each display area between an over-write display and an update display according to an instruction supplied from the input part 14; and a program for displaying the molding data related to each display area according to an input supplied from the input part 14.

The input part 14 is composed of a key switch, a touch-panel interface, a keyboard, a mouse, etc., and is capable of providing an instruction to the display control part 12 according to the contents of information displayed on the display part 15.

The display part 15 is composed of a CRT, LCD, etc., and displays control data on the screen under control of the display control part 12.

The group of sensors 16 includes a plurality of, sensors such as a pressure sensor and a position sensor. These sensors are well known in the art, and a description thereof will be omitted.

Next, a description will be given of an operation of the display apparatus show in FIG. 1.

When the injection molding machine performs an injection operation under the control of the controller 10, each sensor of the group of sensors 16 detects each target for detection and outputs molding data. The molding data sent from the group of sensors 16 is stored in the molding-data memory 11 on an individual sensor basis. The molding-data memory 11 stores the molding data from each sensor for a predetermined time period, which may be varied for each sensor or process. Additionally, the molding data inside the controller 10 is also stored in the molding-data memory 11. When a profile display request is input through the input part 14, the display control part 12 reads the program for defining a plurality of display areas from the program memory 13 and executes the program so as to cause the display part 15 to display a profile display image including two waveform display areas, which are independent from each other and arranged on upper and lower portions of the screen, respectively.

Figure 2:
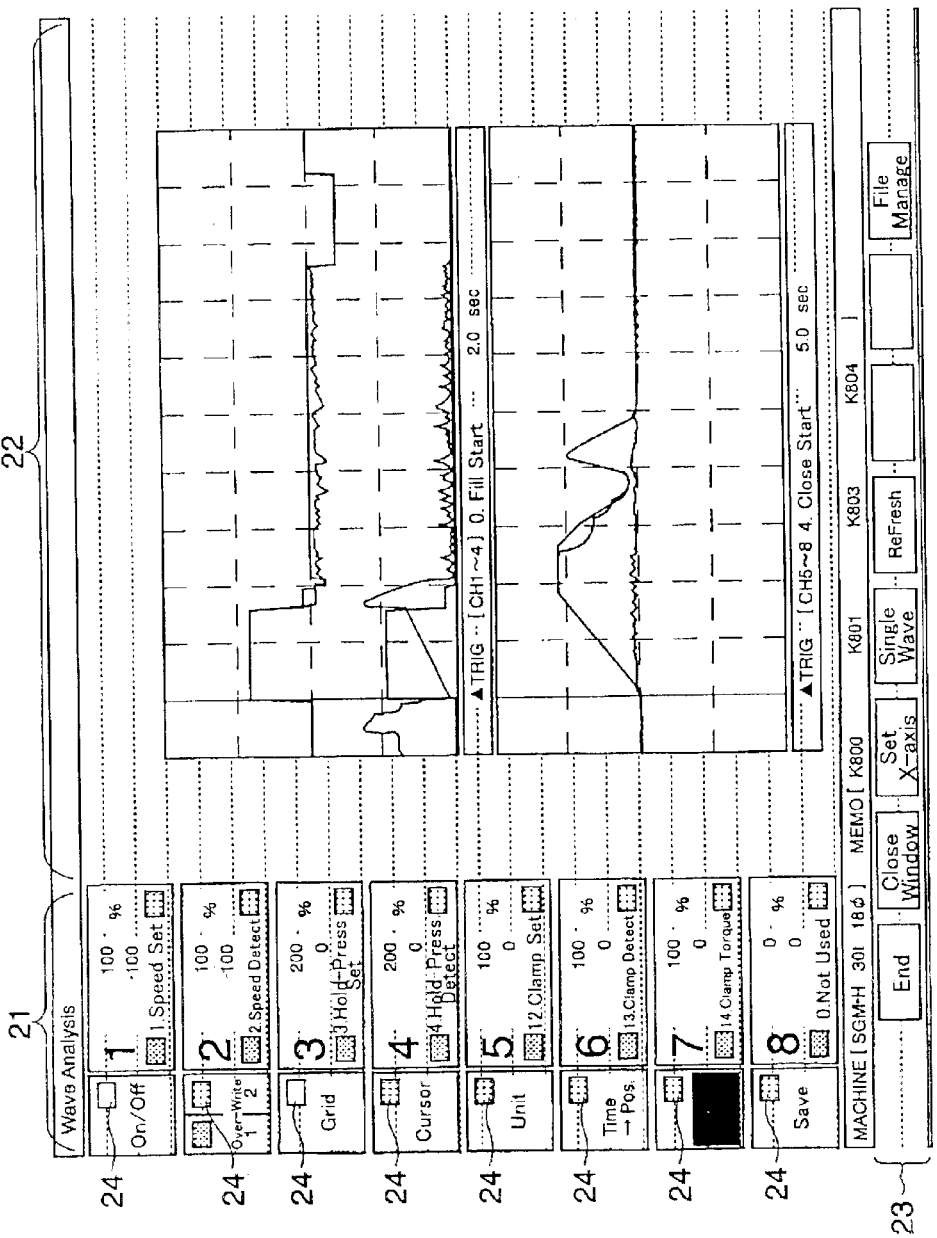
FIG. 2 is an illustration of a screen displayed on the display apparatus shown in FIG. 1.

An example of the waveform display image displayed on the screen of the display part 15 is shown in FIG. 2. The image shown in FIG. 2 is based on the initial setting, which has been set up previously, and the displayed image differs depending on contents of the initial setting.

As shown in FIG. 2, cursor frame portion 21 is provided on the left-hand side of the screen, and a profile display portion 22 is located on the right-hand side. The profile display portion 22 is divided into two areas on upper and lower sides. Additionally, some buttons 23 are displayed on the lower side of the screen.

Cursor frames common to both the upper and lower waveform display areas are arranged in the left-side column of the cursor frame portion 21. A small window 24 provided to each cursor frame indicates whether or not a function assigned to the cursor frame is effective. That is, a blank small window 24 indicates that the function is effective, and a hatched small window 24 indicates that the function is ineffective. The "ON/OFF" cursor frame is for determining whether,to accept an operation with respect to the screen through the input part 14. The "overwrite 1" and "overwrite 2" cursor frames are for determining whether to perform the display of molding data continuously (overwrite) or only once (not overwrite) with respect to each of the upper and lower waveform display areas. The "grid" cursor frame is for deciding whether to display a dotted-line grid in the wave display areas. The "cursor" cursor frame is for deciding whether to display a cursor, which can be operated by a mouse or the like of the input part 14. The "unit display" cursor frame is for deciding whether to display units corresponding to the X-axis (horizontal axis) and the Y-axis (vertical axis) of the waveform display areas. The "Time→Pos." cursor frame is for determining whether to convert a time axis into a location axis. The "save" cursor frame is for determining whether to save the waveform-data currently displayed on the profile display portion 22.

The cursor frames for setting the items (channels) which should be displayed on the profile display portion 22 are arranged along the right-hand columns in the cursor frame portion 21. In the present example, there are eight channels for the items displayable in the profile display portion 22. First to fourth channels correspond to the upper waveform display area and fifth to eighth channels correspond to the lower waveform display area.

When a "waveform display" button located lower side of the screen is pushed by an input operation through the input part 14 after a waveform display image is displayed on the screen of the display part 15, the display control part 12 calls the program to display the molding data stored in the program memory 13. That is, upon detection of the "waveform display" button on the screen, the control display part 12 reads the molding data stored in the molding-data memory 11 according to the contents of setting at that time, and displays the waveform on the profile display portion 22.

A description will now be given of an operation for changing the setting items. It should be noted that a similar operation is performed when an initial setting is performed.

Figure 3:
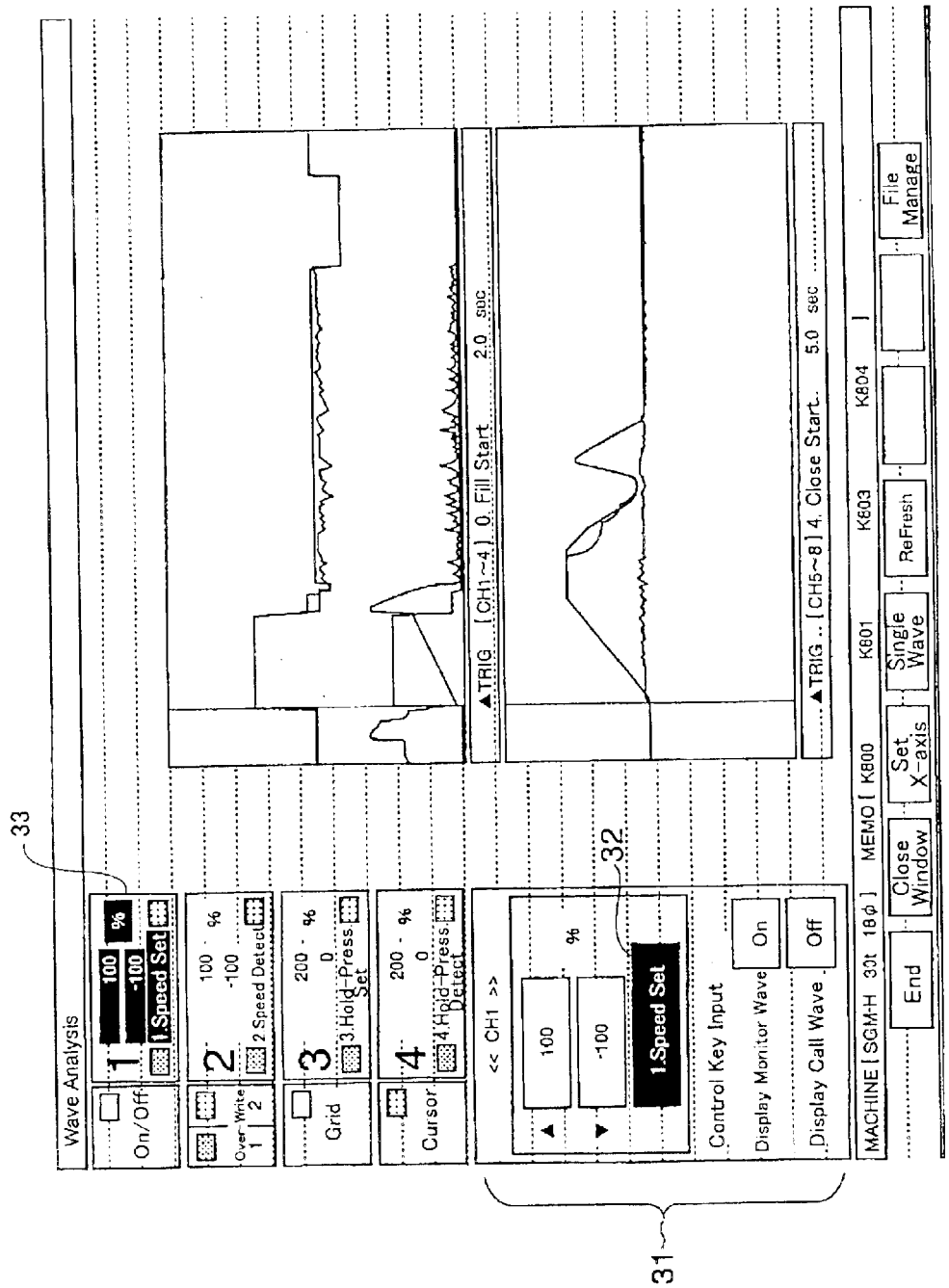
FIG. 3 is an illustration of a screen after selecting a channel 1 in the screen shown in FIG. 2.

First, the cursor frame of an item to be set up is designated by an operation applied to the input part 14 where the waveform display image is displayed on the display part 15. For example, when the cursor frame 33 corresponding to the first channel is designated, the display control part read the program for setting the Y-axis (vertical axis) including a program relating a plurality of sets of molding data to each waveform display areas from the program memory, and executes the program. Then, the screen of the display screen becomes as shown in FIG. 3. That is, the window 31 corresponding to the first channel is open.

Figure 4:
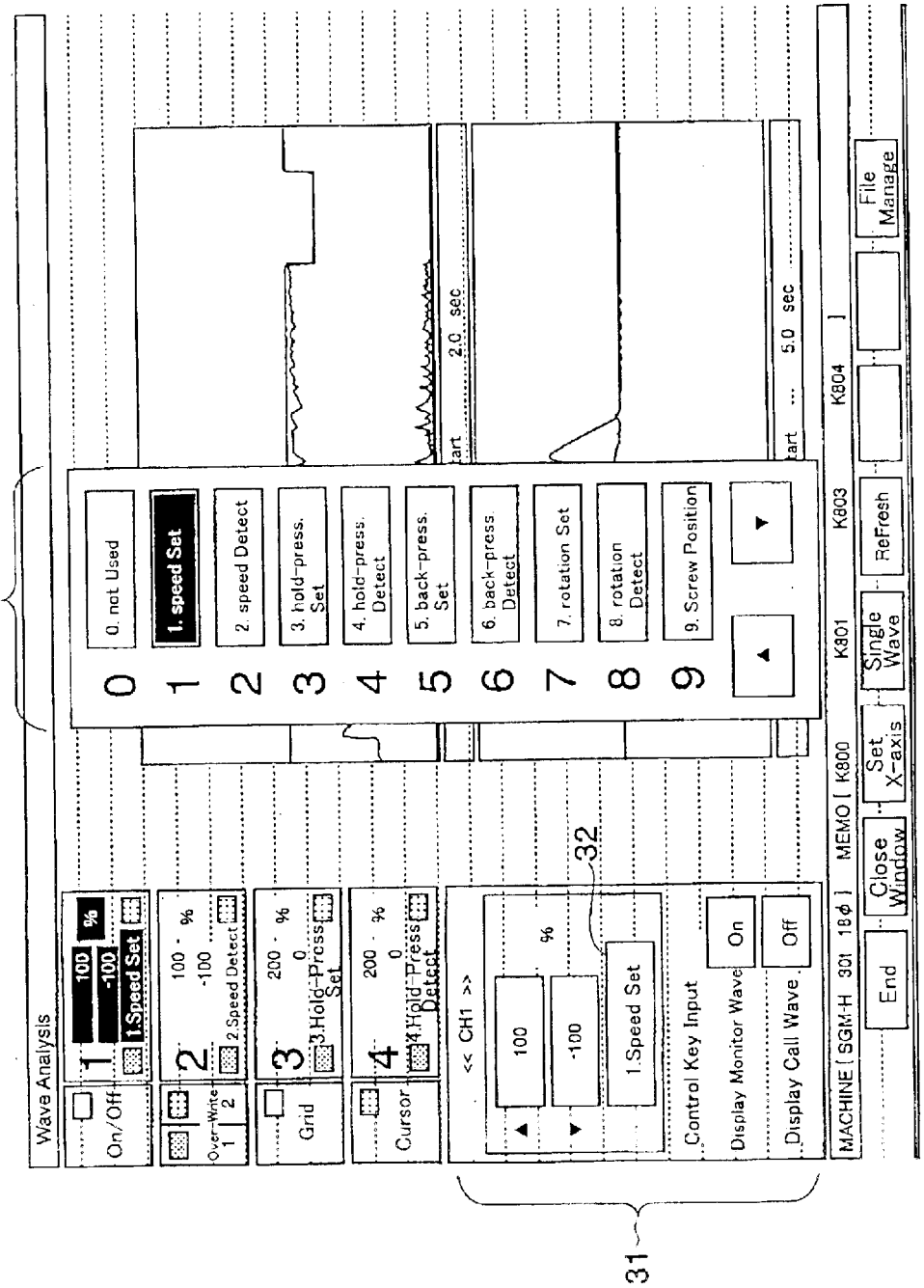
FIG. 4 is an illustration of a screen after pressing a display item button in the screen shown in FIG. 3.

Next, when the waveform display selection button 32 ("1. rate setup") of the opened window 31 is pushed, a selection window 41 is opened further as shown in FIG. 4. The items corresponding to the first channel are determined by pushing one of the buttons in the selection window 41.

Returning to FIG. 3, there are "100" button and "−100" button which are for determining a Y-axis scale in the window 31 corresponding to the first channel. This represents a display scale in the waveform display area. When one of the buttons is pushed, a numerical input window is open so that an arbitrary figure can be input. Additionally, the display scale can be changed by pushing "Δ" button or "∇" button located on the left-hand side of these buttons. It should be noted that, when these buttons are set as "100" and "−100", the center of the Y-axis of each waveform display area is set to "0" level. Moreover, when the buttons are set as "200" and "0", the display scale is set to the same scale as the case where the buttons are set as "100" and "−100" and the lower end of the Y-axis is set to "0" level.

In the window 31 corresponding to the first channel, there are provided a monitor waveform display button and a call waveform display button, one of which is "ON" and the other is "OFF". When the monitor waveform display button is "ON", the molding data is stored in the molding data memory and immediately read out, and the molding data is displayed on the waveform display area in the form of a waveform chart in real time. When the call waveform display button is "ON", the molding data or setting data of a file designated by opening the file selection window is displayed in the waveform display area in the form of a waveform chart.

Figure 5:
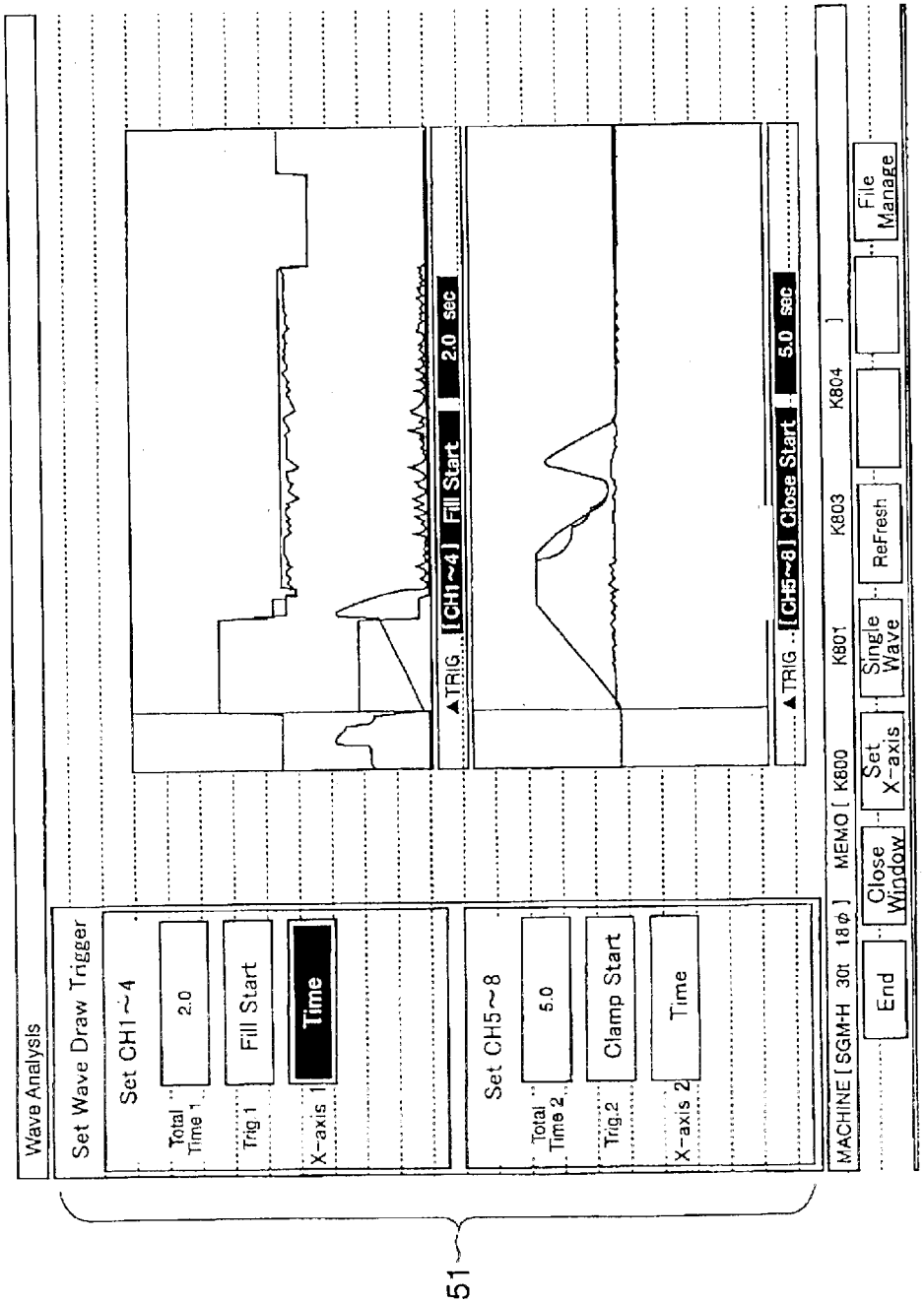
FIG. 5 is an illustration of a screen after pressing an X-axis setting button in the screen shown in FIG. 2.

When the cursor frame of the first channel is designated again in the state shown in FIG. 3, it is returned to the state shown in FIG. 2. However, there is no molding data displayed on the waveform display area. Then, if an "X-axis setting" button (refer to FIG. 2) located in the lower side of the screen is pushed, the display control part 12 reads a program for setting the X-axis (horizontal axis) from the program memory 13 and executes the program. The program for setting the X-axis includes a program for setting a display start timing. Consequently, a waveform drawing trigger setting window 51 opens in the screen of the display part 15 as shown in FIG. 5. The waveform drawing trigger setting window 51 is provided to each of the upper and lower waveform display areas.

Figure 6:
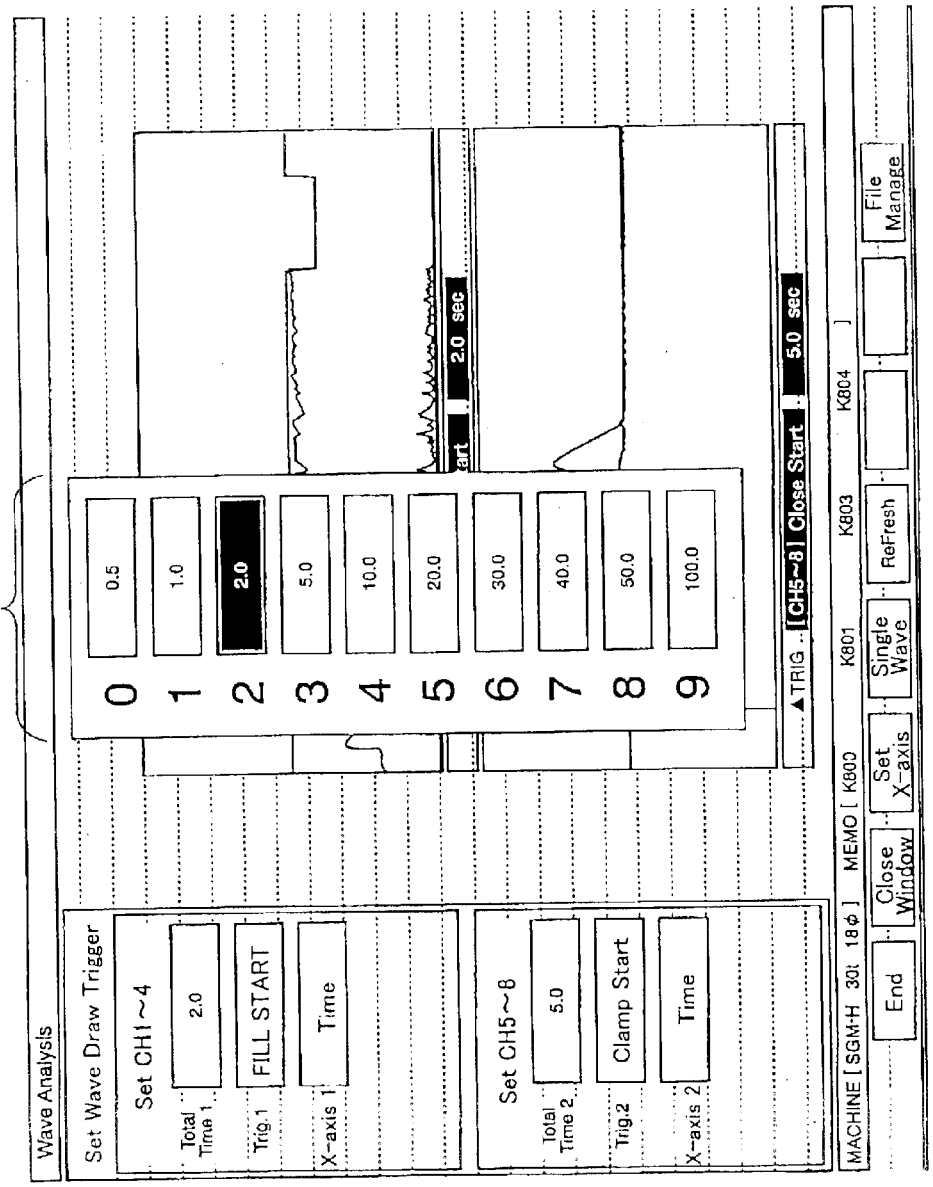
FIG. 6 is an illustration of a screen after pressing a total time button in the screen shown in FIG. 5.

If a total time button 1 (or a total time button 2) which determines the X-axis is pushed in the state of FIG. 5, a time selection window 61 is opened as shown in FIG. 6. By pushing a selection button in the time selection window 61, a time period corresponding to the total time button 1 (or the total time button 2) can be changed. It should be noted that the total time buttons 1 and 2 correspond to the lengths after "TRIG" points of the Y-axis of the upper and lower waveform display areas, respectively.

Figure 7:
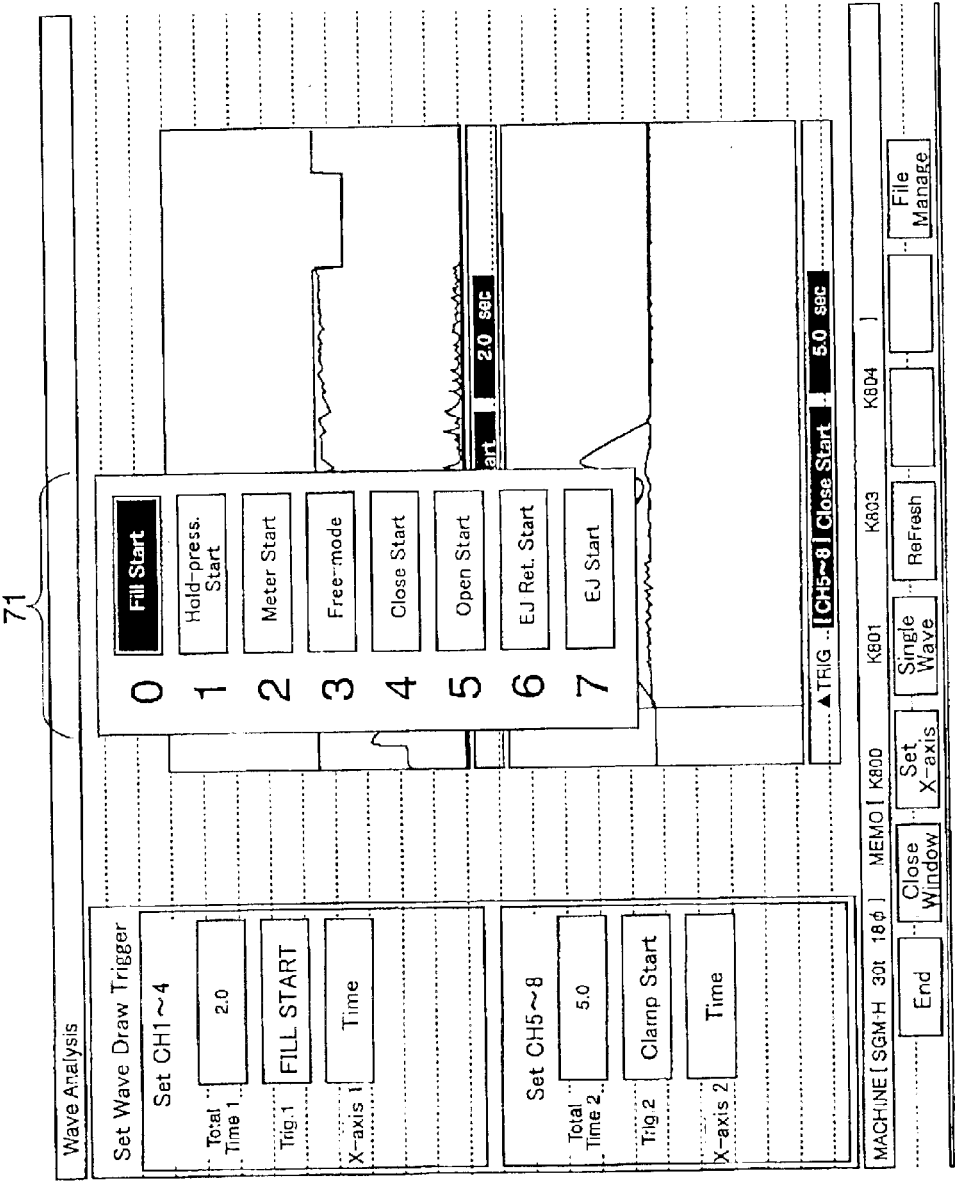
FIG. 7 is an illustration of a screen after pressing a trigger selection button in the screen shown in FIG. 5.

Additionally, if a Trig. 1 button (or a Trig. 2 button) is pushed in the state of FIG. 5, a trigger selection window 71 opens as shown in FIG. 7. The display start timing can be changed by pushing a selection button in the trigger selection window 71. It should be noted that the display start timing is determined using a change in an output (a waveform trigger) of the sensor related to each selection button in the trigger selection window 71.

Figure 8:
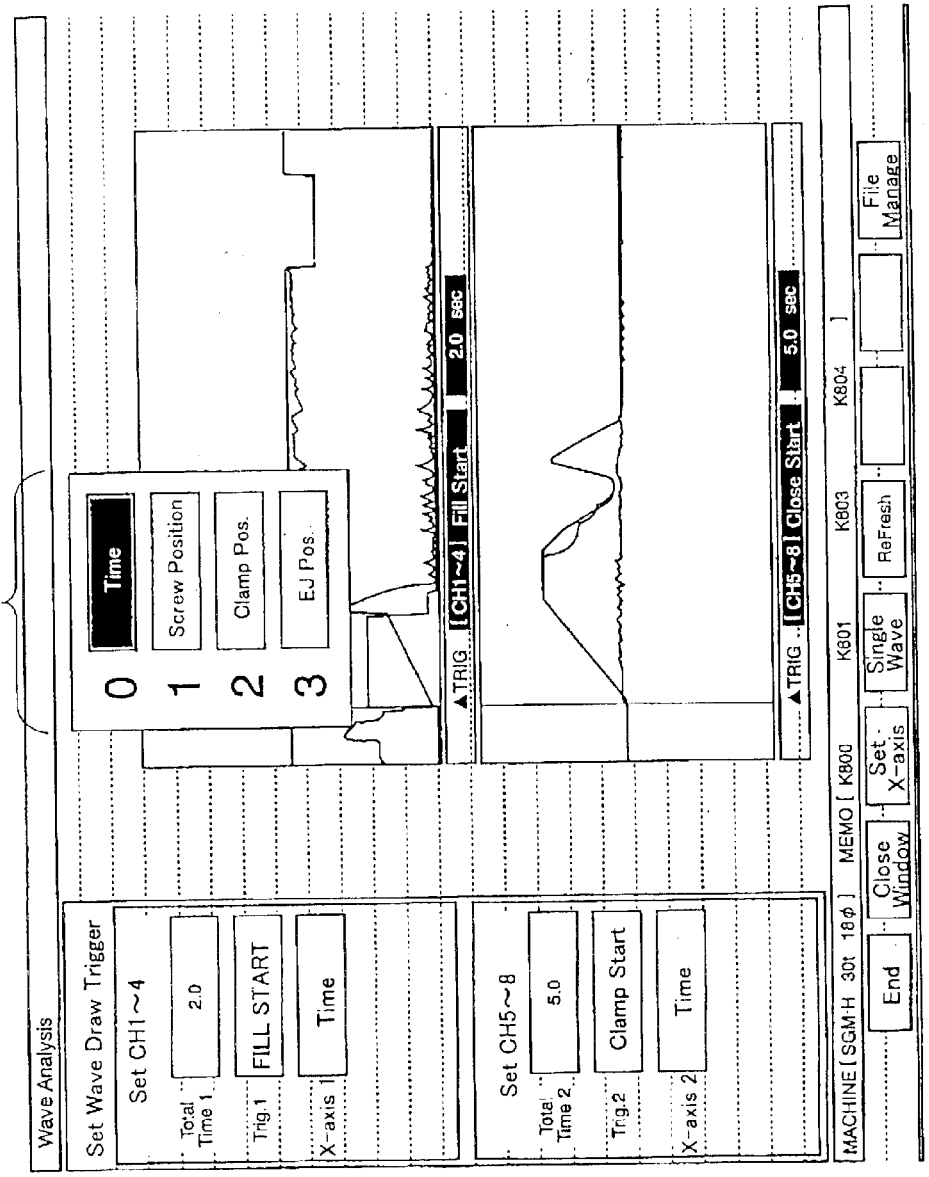
FIG. 8 is an illustration of a screen after pressing an X-axis selection button in the screen shown in FIG. 5.

Additionally, if an X-axis 1 button (or an X-axis 2 button) is pushed in the state of FIG. 5, an X-axis selection window 81 opens as shown in FIG. 8. Further, by pushing the selection button in the X-axis selection window 81, the X-axis can be set as a time-axis or a position-axis (a distance-axis) which represents a distance from a certain reference point.

As mentioned above, in the display apparatus according to the present example, items and scales of the X-axis and Y-axis, a display start timing, etc. can be independently changed freely with respect to each of the upper and lower waveform display areas. Consequently, a plurality of sets of molding data, which are different from each other, can be displayed in the two waveform display areas on the same screen. For example, in the case of FIG. 2, a set of molding data at the time of a filling operation is displayed in the upper waveform display area and another set of molding data at the time of a die closing operation is displayed in the lower waveform display area.

It should be noted that although a description was given in the above example of the case where the number of the waveform display areas is two, the number of the waveform display areas can be more than three. Additionally, although a description was given in the above example of the case where a maximum of four waveform charts can be displayed in each waveform display area, further more waveform chats can be displayed.

As mentioned above, in the display apparatus according to the present example, since the sets of molding data of different processes can be displayed on the same screen, it is easy to check as to where a dispersion occurs in the molding process or it is easy to recognize the condition of the molding machine.

Additionally, since the items and scales of each axis of the two waveform display areas can be changed independently, even in a case where a set of molding data of a process, which can be completed in a short time, and a set of molding data of a process, which requires a relatively long time such a plasticization/measuring process or a complete one cycle are displayed on the same screen, the set of molding data of the process which takes a relatively long time can be displayed on one of the waveform display areas and the set of molding data which takes a relatively short time can be displayed on the other of the waveform display areas, thereby enabling an instantaneous recognition of the condition of the molding machine in the process which takes a relatively short time.

Furthermore, in the display apparatus according to the present example, the same waveform data can be displayed in the manner that one of the two waveform display areas is set in an overwrite setting state and the other is set in a non-overwrite setting state, and, thereby, the most updated waveform data alone can be seen while viewing changes in a continuous molding operation, that is, while checking stability of the molding process.

Moreover, an influence which other processes give at the time of determination and change of forming conditions can be grasped.

Moreover, in the display apparatus according to the present example, since a plurality of waveform display areas can be displayed simultaneously, there is no need to switch the screen, which enables efficient recognition of conditions of an injection molding machine.

Furthermore, in the display apparatus according to the present example, since the items of the X-axis and the Y-axis can be changed arbitrarily, molding data having a low importance of which molding data has been collected but has not been displayed in the form of a waveform chart or molding data having a low frequency of use, an influence of forming conditions in each process, which is given to other processes, can be grasped easily.

For the above-mentioned reasons, in the display apparatus according to the present example, it becomes possible to grasp a condition of an injection molding machine for a short time, and a time spent on determining the forming conditions can be reduced.

Figure 9:
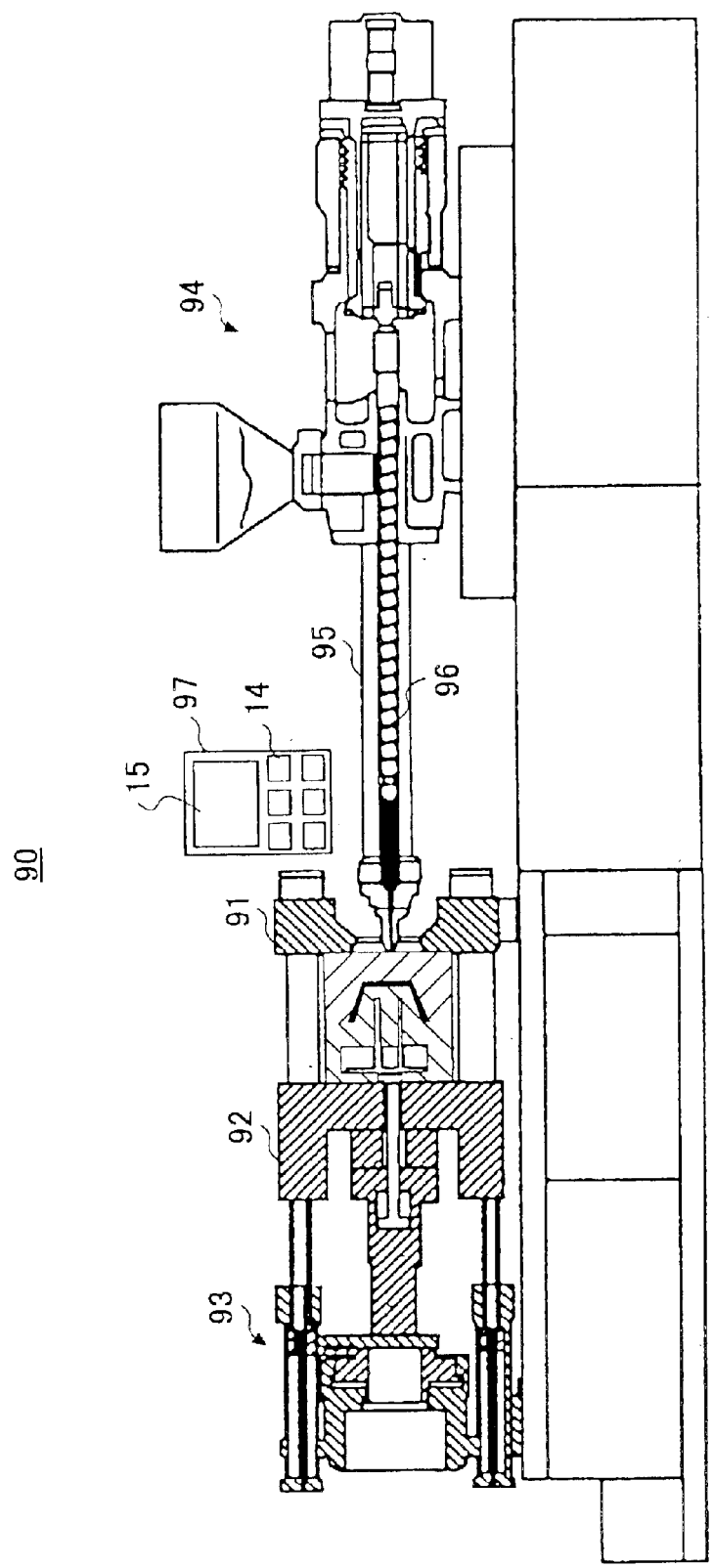
FIG. 9 is a cross-sectional view showing an entire structure of an injection molding machine provided with the display apparatus according to one example of the present invention.

Next, a description will be given, with reference to FIG. 9, of an injection molding machine provided with the display apparatus according to the above-mentioned display apparatus according to the present invention. FIG. 9 is a cross-sectional view showing an entire structure of the injection molding machine according to the above-mentioned example of the present invention.

Although the injection molding machine 90 shown in FIG. 9 is a so-called in-line type injection molding machine among injection molding machines of a screw type, the present invention is also applicable to injection molding machines which adopt other methods such as a prepla type injection molding machine.

The injection molding machine 90 has a fixed platen 91 and a movable platen 92, and a die is attached to each of the fixed platen 91 and the movable platen 92. The movable platen 92 is movable relative to the fixed platen 91 by being driven by a die clamping apparatus 93, and the die is opened and closed by moving the movable platen 92. An injection apparatus 94 for filling a resin into the die is provided on a side opposite to the movable platen 92 with respect to the fixed platen 91. The injection apparatus 94 meters or measures thermally melted resin by a screw 96 which moves while rotating within a cylinder 95, and fills (injects) the measured resin into the die.

The injection molding machine 90 is covered by a cover (not shown) in its entirety, and a control console 97 is attached to the cover. The control console 97 is a part through which an operator performs an input operation, and is provided with the input part 14 and the display part 15 shown in FIG. 1 and connected to the controller 10.

The controller 10 is provided with a molding data memory 11 which stores molding data output from the sensors (the group of sensors) 16 provided in each part of the injection molding machine 90 and molding data inside the controller. The group of sensors 16 includes, for example, a pressure detecting load cell provided on a rear end of a screw 96 and sensors for detecting a rotation speed and a position of the screw 26.

A description will now be given of a combination of the waveform display screens displayed by the display apparatus according to the present example.

In the display apparatus according to the present example, more than two triggers can be set as mentioned above. That is, a plurality of waveform charts in a plurality of processes can be displayed simultaneously with respect to a complete molding cycle. Although molding conditions can be easily adjusted quickly by performing a waveform display at the initial set-up time for determining the molding conditions, the waveform display is effective for not only the initial set-up time but also the time of checking molding stability during a continuous molding operation.

That is, if a kind of a resin or a resin lot is changed during a continuous molding operation of a plastic molding part, it frequently happens that a mold stability is deteriorated. In such a case, the molding stability can be easily checked by displaying waveform charts on the display apparatus while changing and adjusting the molding conditions.

For example, if a setting value of a resin back pressure exerted on the screw is increased, the density of the resin accumulated in the cylinder becomes high, and even if the setting value of the injection pressure in the resin injection process is maintained constant, the detected value of the injection pressure is increased. Thus, if a back pressure setting in the molding conditions is changed, the change in the molding conditions influences not only the plasticization/measuring process but also the injection process. Therefore, the forming stability can be checked efficiently and quickly by referring to simultaneously various waveform charts with a plurality of process start triggers such as an injection start time or a metering start time, which are generally important for checking a molding quality.

Items important for checking the molding stability according to the waveform display, when an injection process start is used as-a trigger, are an injection-speed detection waveform, a holding-pressure detection waveform, etc. Additionally, when a plasticization/measuring process start is used as a trigger, important in evaluation of the molding stability are a screw rotation detection waveform, a resin back pressure detection waveform, a screw position detection waveform, etc.

Here, setting an injection process start as a trigger means displaying the waveform chart from an injection process start time (a filling process start time) in the display area. Similarly, setting a plasticization/measuring process start as a trigger means displaying the waveform chart from a plasticization/measuring process start time.

Moreover, the above-mentioned injection-speed detection waveform indicates a detected value of an injection speed, and corresponds to a detected value of a forward speed of the screw in the injection molding machine shown in FIG. 9. The above-mentioned holding-pressure detection waveform is a pressure waveform at the time of maintaining a pressure which is applied to a resin after the resin is filled in the die, and corresponds to a pressure detection waveform in a pressure holding process obtained by pressurizing the filled resin by the screw in the injection molding machine shown in FIG. 9. The above-mentioned screw rotation detection waveform indicates a rotating speed of the screw for filling a melted resin into the cylinder by the screw in the injection molding machine shown in FIG. 9. The above-mentioned resin back pressure detection waveform corresponds to a reaction force exerted on the screw when the melted resin is forwarded and accumulated by rotating the screw in the injection molding machine shown in FIG. 9. The screw moves rearward due to the reaction force. The above-mentioned screw position detection waveform indicates a position of a leading end of the screw in an axial direction in the injection molding machine shown in FIG. 9.

Figure 10:
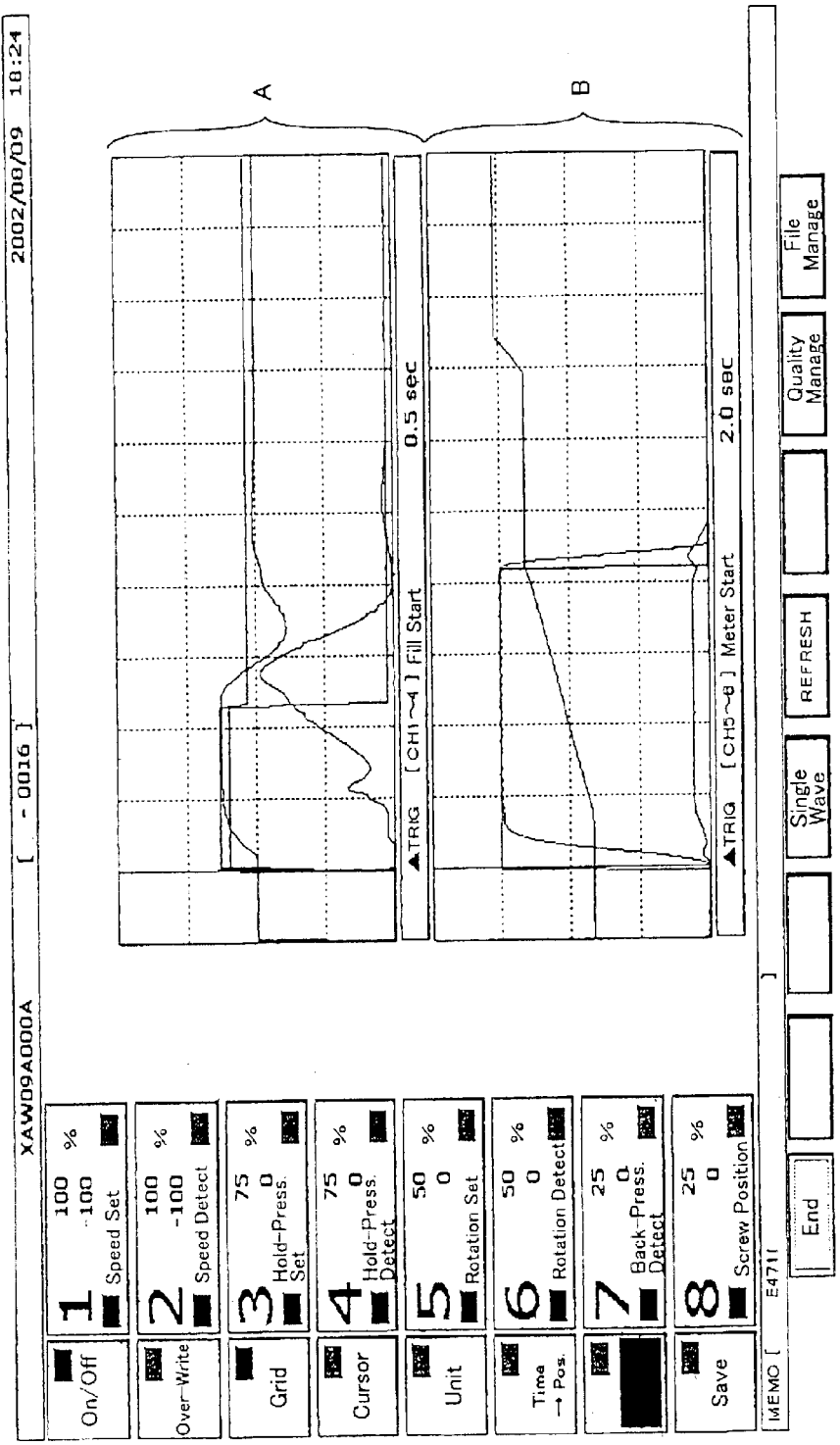
FIG. 10 is an illustration of a screen in which waveform charts are shown in two display areas with different triggers.

FIG. 10 is an illustration showing an example of displaying waveform charts with different triggers in two different display-areas. In the example shown in FIG. 10, various waveform charts are displayed in the upper display area A in a case where an injection process start is set as a trigger, and various waveform charts are displayed in the lower display area B in a case where a plasticization/measuring process start is set as a trigger. For example, while referring to a resin back pressure detection waveform chart in the lower display area B, it can be easily grasped that how the changes in the back pressure of the resin influences the injection pressure waveform chart shown in the upper display area A.

It should be noted that the two display areas can be visually recognized easily by arranging the display areas A and B in parallel up and down on the screen as shown in FIG. 10, which improves convenience for an operator.

Figure 11:
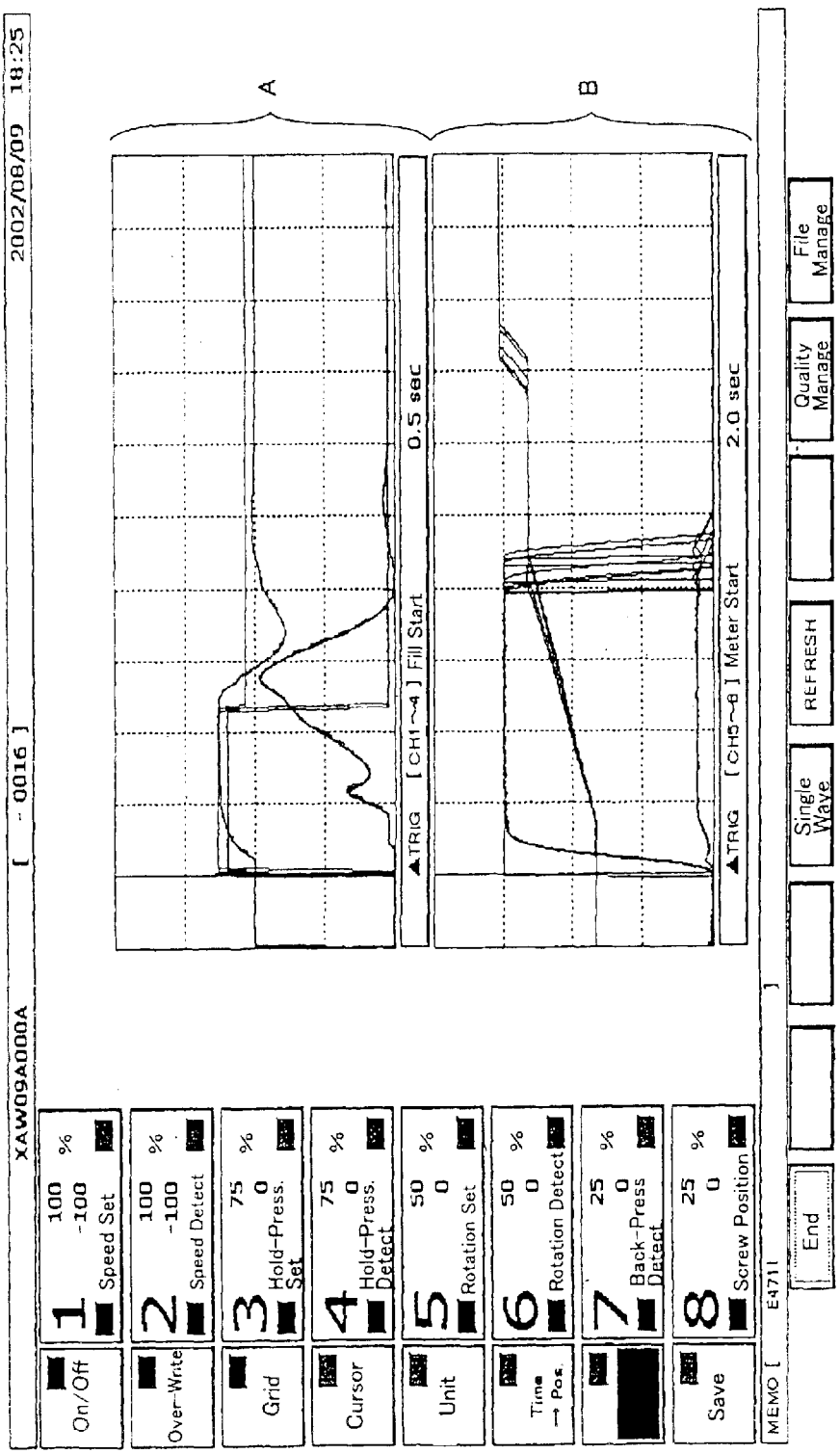
FIG. 11 is an illustration of a screen in which the waveform charts shown in FIG. 10 are over-written.

FIG. 11 is an illustration showing an example in which waveforms shown in FIG. 10 are overwritten. For example, if there is a dispersion in the injection pressure waveform shown in the display area A during a continuous molding operation, the resin back pressure detection waveform can be immediately checked as to whether it is caused by the dispersion in the back pressure. Although the upper display area is set with the injection process start trigger and the lower display area is set with a plasticization/measuring process start trigger in the above example, in addition to this, various timings can be set as triggers, such as a die opening start, an injector projection start, a holding-pressure start, a die opening start, an ejector return start, a free mode (continuous drawing without a trigger), etc.

Additionally, as an example of displaying a plurality of display areas in parallel on the same screen, there is an example in which various waveform charts are displayed by setting an injection process start as a trigger in the upper display area A, and also various waveform charts are displayed by setting the injection process start as a trigger by overwriting in the lower display area B. Thereby, a change in the waveform chart after changing the setting values can be checked in the lower display area B while checking current (most updated) waveform charts immediately after changing the setting values by the waveform charts displayed in the upper display area A. Therefore, the molding stability after changing setting values can be checked easily.

Furthermore, the injection process start may be set as a trigger so as to perform a profile display with the injection process being set mainly in the upper display area A, and similarly, a profile display showing a complete one cycle may be indicated with the injection process start as a trigger in the display area B. Thereby, the screen frequently used during a molding process can be displayed simultaneously in the same screen, which can omit a switching operation of the display screen.

Moreover, in two-material molding machine or two-color molding machine, a waveform chart regarding the F side (operation side) may be displayed on the display area A with an injection process start being set as a trigger, and a waveform chart regarding the R side (non-operation side) may be displayed in the display area B with an injection process start being set as a trigger. Thereby, the waveform charts frequently used in the two-material molding operation can be displayed on the same screen simultaneously, which can eliminate a switching operation of the display screen.

The present invention is not limited to the specifically disclosed embodiments and variations and modifications may be made without departing from the scope of the present invention.

The present application is based on the Japanese priority application No. 2002-328665 filed Oct. 26, 2001, the entire contents of which are hereby incorporated by reference.

What is claimed is:

1. A display apparatus of an injection molding machine, which displays a molding-data profile on a screen of a display unit, molding data detected by a plurality of sensors provided to each part of the injection molding machine or stored in a controller, the display apparatus comprising:
   a first memory part storing the molding data;
   an input part through which an operator input an instruction;
   a second memory part which stores a program for defining a plurality of independent display areas on a screen of the display unit, a program for arbitrarily relating the molding data to each of the display areas in accordance with an instruction input through the input part, a program for setting a display start timing to display the molding data related to each of the display areas in accordance with an instruction input through the input part, and a program for displaying the molding data related to each of the display areas on an individual area basis in accordance with an instruction input through the input part; and
   a display control part which executes the programs stored in the second memory part,
   wherein the molding data is independently displayed in the plurality of display areas on an individual area basis.

2. The display apparatus as claimed in claim 1, wherein the second memory part further stores program for setting a measuring time scale or a measuring distance scale on an individual display area basis in accordance with an instruction input through the input part.

3. The display apparatus as claimed in claim 2, wherein the second memory part further stores a program for setting items of an X-axis and a Y-axis on an individual display area basis in accordance with an instruction input through the input part.

4. The display apparatus as claimed in claim 1, wherein the second memory part further stores a program for switching between an over-writing display and an update display on an individual display area basis in accordance with an instruction input through the input part.

5. The display apparatus as claimed in claim 1, wherein the plurality of display areas include a first display area and a second display area provided on the same screen of the display unit, the first display area displaying one of an injection velocity detection profile and a pressure detection profile from a start time of an injection process, the second display area displaying one of a screw rotating detection profile, a back pressure detection profile and a screw position detection profiled from a start time of a plasticization/measuring process.

6. The display apparatus as claimed in claim 5, wherein the first and second display areas are located parallel to each other on an upper side and a lower side in the same screen of the display unit.

7. The display apparatus as claimed in claim 1, wherein the plurality of display areas include a first display area and a second display area provided on the same screen of the display unit in a parallel relationship on an upper side and a lower side, the first display area displaying a molding-data profile with an injection process start as a trigger, the second display area displaying by overwriting the molding-data profile with the injection process start as a trigger.

8. The display apparatus as claimed in claim 1, wherein the plurality of display areas include a first display area and a second display area provided on the same screen of the display unit in a parallel relationship on an upper side and a lower side, the first display area displaying a molding-data profile of an injection process, the second display area displaying a molding-data profile of a complete molding cycle.

9. The display apparatus as claimed in claim 1, wherein the plurality of display areas include a first display area and a second display area provided on the same screen of the display unit in a parallel relationship on an upper side and a lower side, and
   wherein, when the injection molding machine is a two-material molding machine or a two-color molding machine, the first display area displays a molding-data profile regarding an operation side, and the second display area displays a molding-data profile regarding a non-operation side.

10. An injection molding machine comprising a display apparatus which displays a molding-data profile on a screen of a display unit, molding data detected by a plurality of sensors provided to each part of the injection molding machine or stored in a controller, the display apparatus comprising:

a first memory part storing the molding data;

an input part through which an operator input an instruction;

a second memory part which stores a program for defining a plurality of independent display areas on a screen of the display unit, a program for arbitrarily relating the molding data to each of the display areas in accordance with an instruction input through the input part, a program for setting a display start timing to display the molding data related to each of the display areas in accordance with an instruction input through the input part, and a program for displaying the molding data related to each of the display areas on an individual area basis in accordance with an instruction input through the input part; and a display control part which executes the programs stored in the second memory part, wherein the molding data is independently displayed in the plurality of display areas on an individual area basis.

11. The injection molding machine as claimed in claim 10, wherein the second memory part further stores program for setting a measuring time scale or a measuring distance scale on an individual display area basis in accordance with an instruction input through the input part.

12. The injection molding machine as claimed in claim 11 wherein the second memory part further stores a program for setting items of an X-axis and a Y-axis on an individual display area basis in accordance with an instruction input through the input part.

13. The injection molding machine as claimed in claim 10, wherein the second memory part further stores a program for switching between an over-writing display and an update display on an individual display area basis in accordance with an instruction input through the input part.

14. The injection molding machine as claimed in claim 10, wherein the plurality of display areas include a first display area and a second display area provided on the same screen of the display unit, the first display area displaying one of an injection velocity detection profile and a pressure detecting profile from a start time of an injection process, the second display area displaying one of a screw rotating detection profile, a back pressure detection profile and a screw position detection profile from a start time of a plasticization/measuring process.

15. The injection molding machine as claimed in claim 14, wherein the first and second display areas are located parallel to each other on an upper side and a lower side in the same screen of the display unit.

16. The injection molding machine as claimed in claim 10, wherein the plurality of display areas include a first display area and a second display area provided on the same screen of the display unit in a parallel relationship on an upper side and a lower side, the first display area displaying a molding-data profile with an injection process start as a trigger, the second display area displaying by overwriting the molding-data profile with the injection process start as a trigger.

17. The injection molding machine as claimed in claim 10, wherein the plurality of display areas include a first display area and a second display area provided on the same screen of the display unit in a parallel relationship on an upper side and a lower side, the first display area displaying a molding-data profile of an injection process, the second display area displaying a molding-data profile of a complete molding cycle.

18. The injection molding machine as claimed in claim 10, wherein the plurality of display areas include a first display area and a second display area provided on the same screen of the display unit in a parallel relationship on an upper side and a lower side, and wherein, when the injection molding machine is a two-material molding machine or a two-color molding machine, the first display area displays a molding-data profile regarding an operation side, and the second display area displays a molding-data profile regarding a non-operation side.

* * * * *